United States Patent Office 3,358,053
Patented Dec. 12, 1967

3,358,053
CRYSTALLINE PROPYLENE POLYMER, CONTAINING 4–10% ETHYLENE, BLENDED WITH LINEAR POLYETHYLENE
Donald E. Hostetler, 35 Mountain Ave., Pompton Plains, N.J. 07444
No Drawing. Filed Nov. 9, 1964, Ser. No. 409,998
4 Claims. (Cl. 260—876)

ABSTRACT OF THE DISCLOSURE

A new composition of matter consisting of a component (A) which is a substantially crystalline propylene/ethylene copolymer having improved brittle and impact temperature properties over that of unmodified crystalline polypropylene blended with component (B) which is a linear polyethylene having a density of from 0.93 to 0.96 and a melt index of substantially 0.

---

The present invention relates to a novel and useful composition and to a process for producing such a composition. More particularly, it relates to an improved low temperature impact resistant polypropylene composition and to a process for preparing the composition.

As heretofore known, propylene can be polymerized to a high molecular weight solid polymer by contacting propylene with a catalyst such as titanium trichloride/triethyl aluminum. Typical methods of preparing polypropylene are disclosed in Belgian Patent 538,782 and U.S. Patents 2,949,447; 2,911,384 and 2,825,721. Generally, such processes produce propylene polymers having a molecular weight of from about 50,000 to about 5,000,000 with the major proportion of the polymer being crystalline in that it exhibits a crystalline structure by X-ray analysis and is insoluble in heptane. Crystalline polypropylene is well known in the art for its highly desirable properties such as high tensile strength, high modulus of elasticity and good resistance to elevated temperatures. However, in spite of these desirable physical properties, crystalline polypropylene is known to have one particularly undesirable property in that it becomes quite brittle at low temperatures as described in U.S. Patent 3,018,263 and others. Since many of the articles molded or formed from crystalline polypropylene are to be used outside in cold weather or in other ways subjected to low temperatures, it is highly desirable that the low temperature properties of crystalline polypropylene be modified so that it will not fail when subjected to stress at the lower temperatures.

It is an object of the present invention to provide a polypropylene composition which has improved low temperatures impact resistance as compared to polypropylene as heretofore produced. A further object is to provide a polypropylene composition which improves the low temperature properties while substantially maintaining the other desirable properties. Another object is to provide a process for producing a polypropylene composition having improved low temperature impact resistance. Another object is to provide a process for producing a polypropylene composition which can be molded or processed in the same manner as conventional crystalline polypropylene. A still further object is to provide a process for preparing a polypropylene composition in situ. Other objects will become apparent as the description of the invention proceeds.

In summary, this invention provides an improved low temperature impact resistant crystalline polypropylene composition which is produced by blending 1–50 weight percent of polyethylene based on the total polymer present, with the balance of the polymer consisting of a polypropylene/polyethylene copolymer, and subjecting the blend produced to a temperature of 175–225° C. with mixing for 7–15 minutes. The composition resulting from this blend of components has a final melt index of from about 0.2 to about 25 and a crystalline melting point of at least 150° C. The polypropylene/polyethylene copolymer, made by procedures hereinafter described, contains between about 0.2–40% by weight of ethylene and has an intrinsic viscosity between about 1.0 and about 8.0. The ethylene homopolymer is a polyethylene having a density of 0.93 to 0.960, a melt index of substantially 0.0 (according to ASTM 1239–62T, condition E), and is a substantially linear polymer, such as is commercially produced as particle form polyethylene using such low pressure catalyst systems as are well known in the art; see U.S. 2,825,721; 2,912,419; and 2,824,089.

The polypropylene/polyethylene copolymer used in the blends of this invention may be either a block copolymer or a random copolymer.

The block copolymer of ethylene and propylene can be prepared by any method known in the art. One process which is eminently suitable is disclosed in French Patent 1,358,708 whereby a block copolymer of propylene and ethylene, having an average molecular weight of 50,000 to 5,000,000 is produced.

The random copolymer of ethylene and propylene can be prepared by any method known in the art. One process which is eminently suitable is disclosed in French Patent 1,352,024.

Preferred embodiments of my invention include the following.

For mixing, it is preferred to use a conventional two-roll mill, although any apparatus which can mix the block copolymer and the polyethylene into a homogeneous composition at temperatures of 175–225° C. can be used. Examples of suitable apparatus include extruders, calender rolls, and Banbury type intensive mixers.

The temperature at which the copolymer and the polyethylene are mixed should be chosen so that the polymers are softened enough to be worked easily, but not so high so that the polymers are thermally degraded. Operably this range is 50–275° C., and preferably 175–225° C.

The amount of polyethylene employed in the mixing step with the propylene/ethylene copolymer is operably 1–50 weight percent based on total amount of polymer; and preferably 1–30 weight percent.

The terminology "low temperature impact resistant polypropylene composition" is used in the same sense as "brittle point" which is referred to in numerous patents, such as U.S. Patent 3,018,263. It is the measure of the temperature at which the polymer exhibits brittle failure under specific impact conditions as hereinafter more fully pointed out.

The percentages by weight are based upon the propylene and comonomers used to form the crystalline polypropylene compositions. Should other polymers or materials be added to the compositions of the present invention, the weights of such added materials are excluded from weight percentage calculations.

In carrying out the reaction to make the ethylene-propylene copolymer component, the propylene and/or the ethylene are contacted with the catalyst at any temperature within the range of about −45° C. to about 95° C. Preferably, the reaction is carried out somewhat above room temperature and particularly preferred temperature range is from about 21° C. to about 70° C. The catalyst employed may be any of those well known in the art. $3TiCl_3 \cdot AlCl_3$ or $TiCl_3$ may be used in connection with a hydrocarbon aluminum compound such as triethyl aluminum, triisobutyl aluminum, triisohexyl aluminum, trioctyl aluminum, dimethyl aluminum chloride, diethyl aluminum chloride, ethyl aluminum dichloride, or methyl aluminum dibromide. Other catalysts which are well known in the art for the polypropylene reaction may likewise be employed in the process.

The following examples are given to illustrate the invention and are not intended to limit it in any manner. In the examples all parts are expressed in parts by weight unless otherwise indicated.

The melt index of the examples is measured as described in ASTM-D-1238-62T condition L, except where noted.

The molecular weight ranges of the polypropylene compositions of the examples are determined by the Chaing equation for the intrinsic viscosity (i.v.)—average molecular weight $\overline{MW}$ relationship for polypropylene and polyethylene; polypropylene i.v.=$1.04 \times 10^{-4} \overline{MW}^{0.80}$ and polyethylene=$6.77 \times 10^{-4} \overline{MW}^{0.67}$ (Chaing, "Journal of Polymer Science" vol. 31, p. 453, 1958). For determining the range of the average molecular weight it is first assumed that the composition is all polyethylene and the average molecular weight determined on this basis. It is next assumed that the composition is all polypropylene and the average molecular weight determined. Since the composition contained both components, it is assumed that the average molecular weight would fall within the range between the two values obtained.

Example 1

To a 700 ml. stirred stainless steel pressure reactor is charged, under an argon atmosphere, 0.36 g. of $3TiCl_3 \cdot AlCl_3$ and 4.9 ml. of 1 molar (in cyclohexane) diethyl aluminum chloride solution. The Al/Ti mole ratio is 2/1. The reactor is purged with hydrogen. Then 400 ml. of liquid propylene (15.8 g./cc.) is introduced with stirring at room temperature, providing about 2320 g. of propylene. Polymerization temperature is increased within 5-10 minutes after the start of propylene addition to 50-60° C. with external heating. The reactor pressure is that of propylene gas at equilibrium. At the end of the first 45 minutes, 200 ml. of additional liquid propylene is added to maintain a slurry in the reactor. After 1.5 hours the reactor is vented to 5 p.s.i.g. over 2 minutes and cooled to 25-30° C. After venting, gaseous ethylene is introduced into the reactor at a rate of 0.1 g. per minute for 60 minutes, so as to produce a propylene/ethylene block copolymer. After complete addition the pressure is 0 to 1 p.s.i.g. and the maximum temperature is 55-60° C.

The reactor is then vented and the polymer is purified and recovered by the following procedure. The polymer is transferred into a 2 liter beaker and washed for 2 hours at 70° C. with 1 liter of a 50-50 volume mixture of heptane and isopropyl alcohol. After filtering, the washing is repeated with fresh heptane-isopropyl alcohol mix. The wet polymer is vacuum dried for 8 hours at 80° C.

A 180 g. yield of dry powdered polymer having an average molecular weight of from about 360,000 to 460,000 is obtained with an intrinsic viscosity of about 3.8 and a melt index of 2.7 at 230° C. By infrared analysis, the resin is found to contain 4% by weight ethylene.

The block copolymer (90 g.) was then dry blended with 10% by weight of polyethylene (10 g.), said polyethylene having a density of 0.95, and a melt index of 0.2 (measured according to ASTM-1238-62T, condition E). The blend was compounded on a laboratory scale two roll mill, preheated to a temperature of 185° C. The blend was milled for a total time of about 10 minutes. Speed of operation was 53 ft./min. on the front roll and 31 ft./min. on the back roll, and an open nip was used.

The resulting polymer had a melt index of 5.0 at 230° C. The physical properties of the polymer are given in Table I.

Example 2 (Control)

80 g. of the block copolymer produced in Example 1 was compounded on a two roll mill under the same conditions as in Example 1, except that no polyethylene was added to the mixture. The resulting polymer had a melt index of 2.7 at 230° C. The physical properties of the polymer are given in Table I.

Example 3

To a 700 ml. stirred stainless steel reactor is charged, under an inert atmosphere, 0.28 g. of $3TiCl_3 \cdot AlCl_3$ and 4.0 cc. of 1 molar diethyl aluminum chloride in cyclohexane. The Al/Ti mole ratio is 2/1. The reactor is purged with hydrogen, closed, and pressured to 5 p.s.i.g. with $H_2$. Then 400 ml. of liquid propylene is introduced with stirring at 24° C. The polymerization temperature is increased within about 10 minutes to 60° C. with external heating. The reactor pressure is that of the propylene gas at equilibrium. Five minutes after the propylene charge, 0.3 g. of ethylene is added gradually over a period of 15 seconds. The ethylene addition, which is used up in 1-2 minutes, is repeated every 15 minutes until 2.1 g. of ethylene is added. At the end of the first hour, 200 ml. additional propylene is added to maintain a slurry in the reactor. At the end of one hour and 45 minutes the reactor is then vented to 5 p.s.i.g., cooled to 38° C. and ethylene is introduced at the rate of 0.2 g. per minute for 60 minutes. The pressure at the end of $C_2H_4$ addition is 1 p.s.i.g. and the maximum temperature is 55° C. The polymer produced is a propylene/ethylene random copolymer having a terminal block of ethylene.

After washing and drying the polymer as in Example 1, there is obtained 163 g. of dry powdered polymer with a melt index at 230° C. of 3.8 and an intrinsic viscosity of 5.6. By infrared analysis the resin is found to contain 6.2% ethylene.

A melt blend of 9 parts by weight (90 g.) copolymer with 1 part by weight (10 g.) of a polyethylene having an intrinsic viscosity of 3.5 and a melt index of 0 at 190° C., (according to ASTM-1238-62T, condition E) was prepared as described in Example 1. The physical properties of the melt blend are shown in Table I.

Example 4 (Control)

A control milled sample of the copolymer prepared in Example 3 was also prepared, using the same conditions in Example 3 during milling, except that no polyethylene was added. Physical properties of the polymer are shown in Table I.

Example 5

To a 700 ml. stirred stainless steel reactor is charged, under an inert atmosphere, 0.32 g. of $3TiCl_3 \cdot AlCl_3$ and 4.5 cc. of 1.0 molar diethyl aluminum chloride in cyclohexane. The procedure is then followed as in Example 1 except that after 1 hour and 45 minutes the reactor is vented to 5 p.s.i.g., cooled to 38° C. and ethylene is introduced at the rate of 0.3 g. per minute for 60 minutes. The pressure at the end of $C_2$ addition is 1 p.s.i.g. and the maximum temperature is 55° C. The polymer produced is a propylene/ethylene block copolymer.

After washing and drying the polymer as in Example 1, a 183 g. yield of polymer is obtained with a melt index at 230° C. of 2.1 and an intrinsic viscosity of 3.1. By infrared analysis the resin is found to contain 8.6% ethylene.

A melt blend, of 8 parts by weight (80 g.) of the copolymer with 2 parts by weight (20 g.) of a polyethylene having an intrinsic viscosity of 3.5 and a melt index 0 at 190° C. (according to ASTM-1238-62T, condition E) was prepared as described in Example 1. The physical properties of the melt blend are shown in Table I.

Example 6 (Control)

A control milled sample of the copolymer prepared in Example 5 was also prepared, using the same conditions as in Example 3 during melting, except that no polyethylene was added. Physical properties of the polymer are shown in Table I.

Example 7

For comparison purposes, a commercially obtained general purpose polypropylene resin having an intrinsic viscosity of about 3.2 and an average molecular weight of about 420,000 is tested in the same manner as the polymer of Example 1. The physical properties of the polymer are given in Table I.

index of substantially 0; said composition having a crystalline melting point of at least 150° C. and a tensile impact in ft. lbs./in.² above about 100.

2. The composition of claim 1 wherein the ethylene/propylene copolymer is a block copolymer composed of a propylene polymer block followed by an ethylene polymer block.

TABLE I

| Example No. | Melt Index at 230° C.[a] | Percent Ethylene [b] | Notched impact brittleness test temp., ° C.[c] | Tensile impact, ft.lbs./in.² [d] | Crystalline melting pt., ° C.[e] | Gurley stiffness, mg./20[f] | Tensile strength at Yield, p.s.i.g.[g] |
|---|---|---|---|---|---|---|---|
| 1 | 5.0 | 14.0 | −10 | 100 | 165 | 7,100 | 4,900 |
| 2 (control) | 2.7 | 4.0 | +5 | 35 | 169 | 6,300 | 4,600 |
| 3 | 2.2 | 16.2 | −12 | 107 | 169 | 6,500 | 5,370 |
| 4 (control) | 3.8 | 6.2 | +6 | 70 | 169 | 6,300 | 4,376 |
| 5 | 1.2 | 28.6 | −18 | 141 | 162 | 6,400 | 4,200 |
| 6 (control) | 2.1 | 8.6 | −7 | 80 | 168 | 6,100 | 3,900 |
| 7 (control) | 3.4 | 0 | +55 | 20 | | | |

[a] ASTM-D1238-62T, Condition L.
[b] By infrared analysis; includes that in the block copolymer plus amount added in mixing step.
[c] ASTM-D746-57T except that different samples bars (0.25″ wide x 1.5″ long x 0.075″ thick) are cut from sheets pressed at 400° F. The sheets are cooled in the press at 25° F. per minute. The samples are placed in the Scot tester with the width parallel to the impact bar. A notch 0.015″ deep is cut across the thickness with a razor sharp edge.
[d] ASTM-D1822-61T.
[e] Measured with a microscope under crossed nicols.
[f] Gurley Stiffness Tester procedure.
[g] ASTM designation D638-60T except that ¼″ wide x .020″ thick x 4″ length strips cut from a 6″ sheet (pressed at 400° F. and cooled at 25° F. per minute) are clamped in the Instron with a one inch jaw separation and pulled at 20″ per minute. The modulus at 1% strain is determined at a pull speed of 0.2″ minute with a 2″ jaw separation.

While in the above examples unmodified polypropylene compositions, are produced, it is obvious that other materials such as dyes, pigments, fibers and other polymers may be introduced into the polypropylene compositions of the present invention without substantial alteration of the physical properties of the shaped structures formed from such compositions.

The polypropylene compositions formed in accordance with the present invention can be fabricated into useful articles in the same manner as polypropylene. For example, the compositions can be blow-molded, injection molded or extruded to form wastebaskets, bottles, tubing, films, and the like.

Many equivalent modifications will be apparent to those skilled in the art from a reading of the foregoing without a departure from the inventive concept.

What is claimed is:

1. A substantially crystalline composition consisting essentially of a homogeneous blend of a substantially crystalline ethylene/propylene copolymer with linear polyethylene; the polyethylene employed in an amount of 1 to 50 weight percent of the combined weight of copolymer and polyethylene; the copolymer containing from about 4 to 10 weight percent of ethylene and having an intrinsic viscosity of between about 1.0 to about 8.0 and a notched impact brittleness of about +6° C. and below; the linear polyethylene having a density of 0.93 to 0.96 and a melt 3. The composition of claim 1 wherein the ethylene/propylene copolymer is composed of a substantially crystalline ethylene propylene random copolymer block followed by an ethylene polymer block.

4. The composition of claim 1 having a melt index of from about 0.2 to about 25 and a notched impact brittleness temperature below about −10° C. and a crystalline melting point of at least about 162° C.

References Cited

UNITED STATES PATENTS

| | | | |
|---|---|---|---|
| 3,112,300 | 11/1963 | Natta et al. | 260—897 |
| 3,137,672 | 6/1964 | Lehane | 260—897 |
| 3,176,052 | 3/1965 | Peticolas | 260—897 |
| 3,200,173 | 8/1965 | Schilling | 260—897 |
| 3,228,883 | 1/1966 | Di Guillio et al. | 260—897 |
| 3,256,367 | 6/1966 | Jayne | 260—897 |
| 3,265,771 | 2/1961 | Ray et al. | 260—897 |
| 3,301,921 | 1/1967 | Short | 260—897 |

FOREIGN PATENTS

| | | |
|---|---|---|
| 626,849 | 8/1961 | Canada. |
| 958,079 | 5/1964 | Great Britain. |

MURRAY TILLMAN, *Primary Examiner.*

T. G. FIELD, Jr., *Assistant Examiner.*